May 1, 1923.
H. R. BERRY
1,453,655
PROCESS FOR GAS MAKING
Filed March 22, 1923
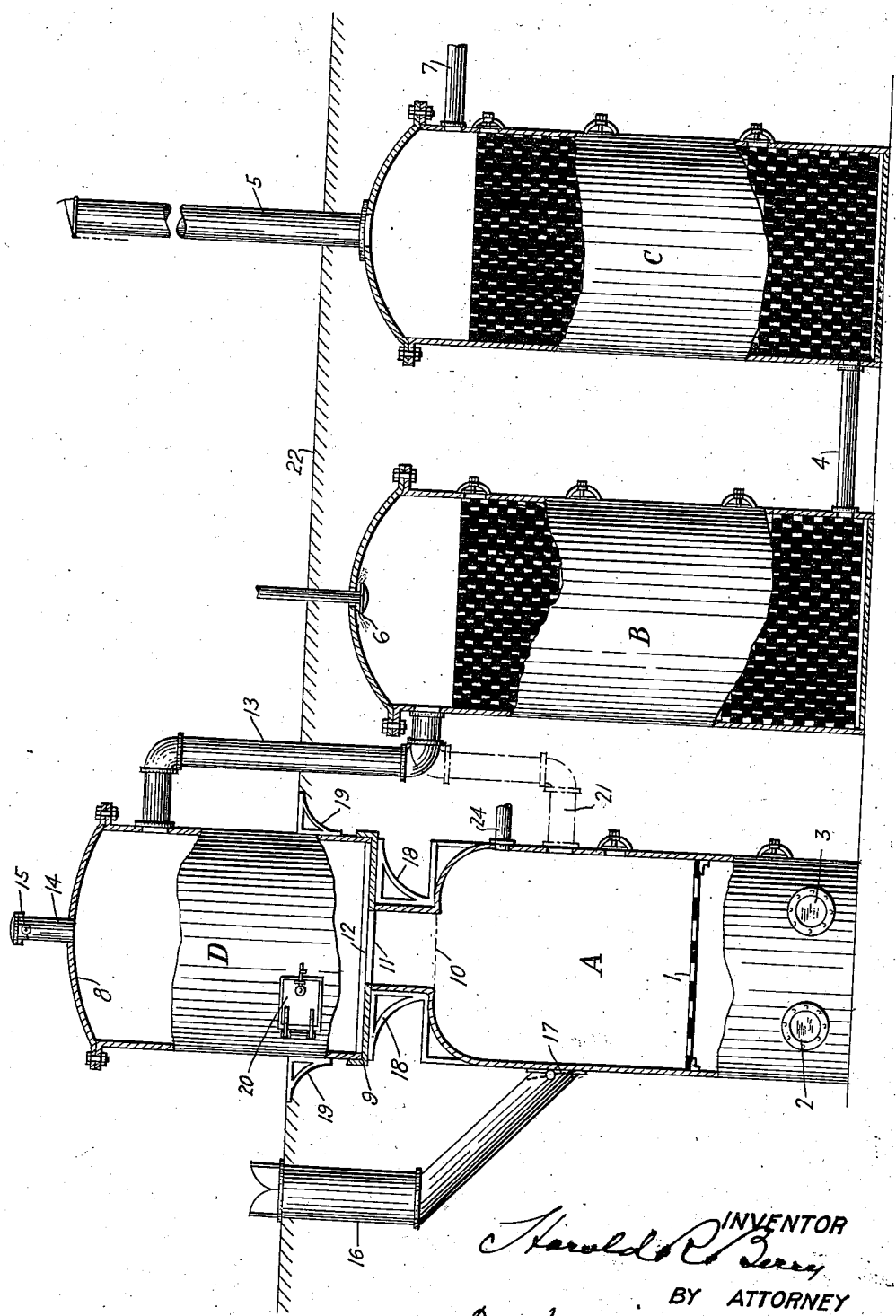
INVENTOR
BY ATTORNEY Patented May 1, 1923.

1,453,655

UNITED STATES PATENT OFFICE.

HAROLD R. BERRY, OF BROOKLYN, NEW YORK, ASSIGNOR TO PETROLEUM RESEARCH AND BY-PRODUCTS COMPANY, OF WILMINGTON, DELAWARE, A CORPORATION OF DELAWARE.

PROCESS FOR GAS MAKING.

Application filed March 22, 1923. Serial No. 626,909.

*To all whom it may concern:*

Be it known that I, HAROLD R. BERRY, a citizen of the United States, residing at Brooklyn, in the county of Kings and State of New York, have invented certain new and useful Improvements in Processes for Gas Making, of which the following is a full, clear, and exact description, such as will enable others skilled in the art to which it appertains to make and use the same.

The object of this invention is the manufacture of non-toxic combustible gas. The process contemplates substituting for carbon monoxide, by elementary chemical reaction, gaseous material equally high in thermal unit value and not possessed of the toxic detriment. Though certain materials, sustaining reactions utilized are found at certain periods of the operation substantially unchanged, this function of the process is not to be classified as due to catalysis, but as the occasion of dual reaction in which a second reaction effaces the product of the first.

As carbon dioxide is an inert, non-combustible gas and as the monoxide yields thermal value when burned, universal practice prescribes maximum yield in monoxide and minimum production of dioxide quantities in gas making.

The claim presented is that the practice is not sound; that under coal bed conditions for artificial gas production, total quantities of heat units available from combustion of resultant gases are reduced, not increased, by occurrence of carbon monoxide quantities.

No attempt will be made herein to enumerate the various substances susceptible of use as reagents, but a single material will be indicated illustrative of the class.

Though the process may be applied to the various methods by which the variety of carbon monoxide containing gases are produced, no attempt, however, will be made to show specific application in each case, but application of the process will be shown with respect to a specific gas, water gas, for instance, as illustrative of the application of the process to the gas making art.

The apparatus presented is not necessarily the most efficient, but possibly, the simplest from the standpoint of minimum change needed in standard equipment, for utilizing the process presented.

It is only within extremely few localities that water gas is supplied for public consumption without enrichment, hence presentment of the present process is carried in its operation through carburettor and super-heater and to the production of an enriched water gas sufficient in thermal value to satisfy the customary local requirement of 525 B. t. u. per M. cubic feet of gas.

The novelty of the invention includes not only the reactions involved in producing a final, commercial, enriched water gas product but also production with certain additions and modifications in the manner water gas is produced, of gas manufactured after the fashion of water gas, substantially freed, however, of carbon monoxide.

There is presented in Figures A, B and C, substantially in cross section, a generator, carburettor and super-heater standardized as the elements in water gas generation. In the generator Figure "A", the top of its interior as used in practice is shown by dot and dash line 10—Figure "A", and no opening 17 nor pipe 24—Figure "A" is customarily in use.

The grate for sustaining the bed of carbonaceous material in the generator is indicated 1—Figure "A". A charge of carbonaceous material on this grate is heated to incandescence by means of a blast delivered, for instance, through intake 2—Figure "A". The direction taken by the combustion products and heat values during the blow period is through pipe 21—Figure "A" shown in dot and dash line. The course may then be downward through the checkerbrick structure of the carburettor Figure "B", through connecting pipe 4—Figure "B", through the checkerbrick structure of the super-heater Figure "C"; thence, through stack 5—Figure "C". During this blasting or blowing period, the three apparatus elements are heated to the needed temperature for the subsequent operation of gas-making; when the inlet of air is discontinued by means of a valve shut-off, not shown, and the opening 2—Figure "A" is closed, and steam is delivered through opening 3—Figure "A".

The familiar process then follows of hydrogen released from steam ($H_2O$), oxidation of the carbon of the coal into $CO$ and $CO_2$, delivery of the resultant gases into contact with enriching oil supplied through sprayer 6, element B, and conduction through pipe 4 for fixation in element "C", thence finding exit through pipe 7 element "C" and through various devices for scrubbing, washing and purifying to the gas holder.

Application of the process presented may be had by addition to the standard water gas manufacturing methods by, for instance, adding to the top of the generator Figure "A" a shell—Figure "D" of any suitable material and type of construction. This shell possesses a top 8—Figure "D", and a bottom 9—Figure "D", through which is cut a hole 11—Figure "D", installed in the bottom of which is a mesh grating 12—Figure "D". The customarily used pipe 21—Figure "A" is eliminated and pipe 24—Figure "A" is supplied. Pipe 13—Figure "D" is installed connecting the interior of Figure "D" with the interior of carburettor Figure "B". Figure "D" is supplied at its uppermost part with inlet 14 and cap valve 15. There is also added to Figure "A" an intake or chute of suitable size 16—Figure "A" equipped with valve or gate 17—Figure "A". 18 and 19 represent any suitable means of brace and support for the added member—Figure "D"; 22 represents a working platform.

In utilizing the process presented in the apparatus indicated, there is supplied through intake 14—Figure "D", upon grate 12—Figure "D" in finely divided parts—shavings, strips and borings of any material which, under the heat conditions established in water gas generation, will react with steam forming an oxide and releasing hydrogen, and also, in the presence of carbon monoxide under like conditions, will give up the oxygen acquired in the initial oxidizing step to the carbon monoxide of the water gas, forming carbon dioxide and thus itself returning to its own unoxidized, free condition, as, for instance, scrap steel and iron borings and shavings.

The quantity requirement of such material is governed more by the available surface contact afforded by small physical division, rather than by mass. This is true because the steam which oxidizes, for instance, steel and iron shavings and borings is accompanied with carbon monoxide, the almost simultaneous reaction of which is to deoxidize the oxides of the reagent into primary, metallic, free state.

The steam oxidizing the iron and steel material with hydrogen release, and the carbon monoxide regenerating the metal by carbon dioxide formation, constitutes a cycle.

In the illustrative apparatus presented, the customary apparatus is further modified by installing, for instance, chute 16 and valve 17 utilized for delivery of coal charges to bed 1—Figure "A" necessitated by closing the usual avenue through the top of Figure "A", by installation of Figure "D".

*In operation.*

As to the availability of heat for effecting needed temperature of the material deposited upon grate 12—Figure "D", it will be found substantially correct and within the bounds of practice to state that in operating, for instance, any standard twelve foot diameter water gas unit, there is delivered during the blow period some 25,000 cubic feet of air per minute—an average length of such period approximates 2½ minutes and a pyrometer placed at the exit of the super-heater Figure "C" will register above 1400° F. throughout the blow, a quantity of heat is present, so great as to render practically negligible any heat absorption requirement by the reagent employed in the operation of Figure "D".

In the gas making run it is customary to deliver through intake 3—Figure "A" steam in amount greater than the reaction requirements occurrent by its passage through grate 1—Figure "A".

The reason for this is that the practice is to regard an increase of steam volume through the carbon bed 1—Figure "A" as increasing the CO values with curtailment of $CO_2$ quantities. CO in combustion possessing about 323 B. t. u. per cubic foot and $CO_2$ being inert, economy seems apparent.

The following facts appear, however, completely at variance with the practice.

Results of observation, fully corroborated by much literature on the subject show that at about 600° cent. the reaction of oxygen and carbon yields, within about 3%, a total $CO_2$ quantity. As the temperature is increased, monoxide values increase until at somewhat over 1000° cent. the reaction of carbon and oxygen yields but a little over 3% of $CO_2$. Temperature rather than steam quantities seem to govern.

The foregoing has furnished the foundation for the familiarly presented hypothesis that all primary oxidation reactions of carbon are to $CO_2$ and that the occurrence of monoxide quantities is due to increased atomic reaction energy induced by elevated temperature; whereby the dioxide molecule in the presence of excess carbon produces the reaction $C+CO_2=2CO$.

An interesting table of observations will be found in Gas Engineering Practice, Latta, page 10, Van Nostrand 1907, in which not only temperatures, but rates of steam flow are contrasted under differing conditions, from which it appears that, temperatures remaining constant, increased rate of steam flow increases CO quantities.

In this effect produced by speed regulation of steam flow is to be found the steam quantity precept of present practice, which means that it follows as a necessity that through a pipe of fixed diameter a larger quantity must move with greater velocity than a lesser. When steam quantities are increased within the generator beyond reaction requirements velocity is augmented proportionately with the increase.

The endothermic character of water gas generator reactions and the heat absorption by prescribed quantities of undecomposed steam passing through the carbon bed must thereby reduce temperatures and CO quantitative recoveries.

Furthermore, even though maximum CO values could be recovered in accordance with the effort of present practice, it appears that the number of units of combustive value in the resultant gas would not be increased. And the reason for this is as follows:

It is to be observed in water gas manufacture, that the element oxygen occurrent in the CO and $CO_2$ product gases is derived from $H_2O$. It is impossible to obtain oxygen from this source for combining with carbon without releasing, as free hydrogen, the co-efficiental quantity of hydrogen from the $H_2O$ molecule. In every such molecule ($H_2O$) there is always $\frac{1}{8}$ by weight of hydrogen to the amount of oxygen.

Thus, if 12 pounds of C is in combination with 16 pounds of oxygen, there is formed 28 pounds of carbon monoxide. But, to obtain the 16 pounds of oxygen, $\frac{1}{8}$ of that amount by weight must have been liberated as hydrogen, or 2 pounds of hydrogen, or the $H_2O$ pounds in the form of steam must be the sum of these which is O—16 lbs.+ H—2 lbs.=18 lbs. $H_2O$.

The quantities and thermal values involved are these:

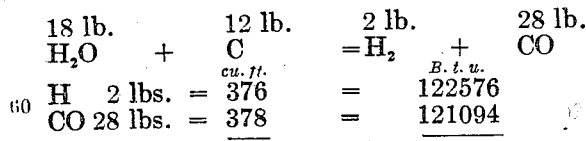

12 lb. C to CO = 754 cu. ft. and 243670 B. t. u.

Had the reaction of the 12 lb. of carbon been entirely to carbon dioxide instead of to carbon monoxide, the result would be:

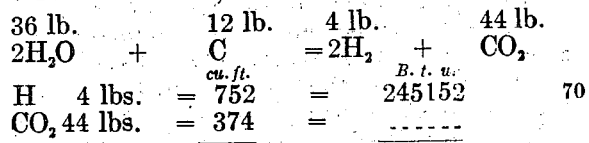

12 lb. C to $CO_2$ = 1126 cu. ft. and 245152 B. t. u.

The reaction to $CO_2$ compared with the reaction to CO, while yielding greatly increased carbon dioxide quantities and greatly increased gas volume, nevertheless, shows in the free hydrogen content, a total B. t. u. thermal value which is at least the equal of the total thermal measure of the gas quantities produced in the reaction to CO. So that the total available B. t. u.'s occurrent in the reaction—$2H_2O+C=2H_2+CO_2$ are not diminished when compared with the reaction— $H_2O+C=H_2+CO$.

Another consideration is involved in considering the preferability of the process presented, founded upon the fact before mentioned, that at low temperatures with an initial heat condition of approximately 600° cent. large hydrogen and dioxide quantities are produced. The reason for limiting the gas making period in water gas manufacture is that, as the temperature falls in the grate, the dioxide quantities increase; hence, the supply of steam is discontinued and a blow period begins. As it is not the purpose in the process under discussion to recover monoxide values, but to liberate large quantities of hydrogen through the production of dioxide, the steaming period continues to low temperature. To a temperature, in fact, limited only by heat availability for converting the steam in contact with the carbon into free hydrogen and dioxide.

Practice and calculation easily demonstrate the fact that only between 30 and 35% of the carbon bed charge is available for reaction in water gas manufacture. The remaining and far greater part of the charge is consumed in producing through combustion high heat conditions required in the manufacture of carbon monoxide. It becomes completely evident that in utilizing the process presented, the steaming period of the run is not discontinued around 2000° F., but is continued even to so low a temperature that practically the entire carbon bed yield may be hydrogen and dioxide. Thus, instead of approximately one-third of the coal bed charge entering into gas producing reactions, it is found that an increased percentage of such charge is so available. This produces enormous increase in the total volume of gas produced from like quantities of carbon charge supplied.

A second step in the process presented includes the use of a reaction zone supplied with suitable reagent material which will oxidize under the conditions established into an oxide, which oxide will part with its oxygen to carbon monoxide, producing carbon dioxide, thus rejuvenating itself.

Operation of this second function of the process may be had by delivery upon grate 12—Figure "D", of scrap iron and steel filing or borings, or other suitable material through which the gaseous products from the water gas generator grate are conducted.

Accompanying the gaseous products through grate 12—Figure "D" are steam quantities delivered, for instance, through pipe 24—Figure "A" in amount sufficient to produce some or all of the following reactions:

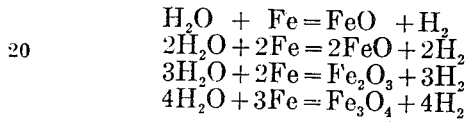

$$H_2O + Fe = FeO + H_2$$
$$2H_2O + 2Fe = 2FeO + 2H_2$$
$$3H_2O + 2Fe = Fe_2O_3 + 3H_2$$
$$4H_2O + 3Fe = Fe_3O_4 + 4H_2$$

Such carbon monoxide quantities as are produced from grate 1—Figure "A" contact the oxidized reagent material with one or more of the results:

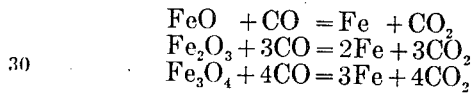

$$FeO + CO = Fe + CO_2$$
$$Fe_2O_3 + 3CO = 2Fe + 3CO_2$$
$$Fe_3O_4 + 4CO = 3Fe + 4CO_2$$

The oxides formed through the agency of steam are thus effaced by giving up their oxygen for oxidization of carbon monoxide into carbon dioxide and the material is coincidently serviceable for re-oxidation, hydrogen release and continuity of repetition.

In operating this second function of the process, a reversible reaction problem is presented by contacting hydrogen, carbon monoxide, steam and such a reagent material as iron.

In solving this problem it is again found that temperatures and proportions are the controlling factors. Experimental observation and literature on the subject establish, within practical limits, the accuracy of the following:

At 400° F. X cubic feet of hydrogen plus 20X cubic feet of steam pass through a ferrous reagent material without respective quantitive change. Any excess of steam over the 20:1 ratio yields a co-efficiental quantity of equal amount as iron oxides and free hydrogen.

At 800° F. the ratio for balanced reaction with no quantitive alteration in material supplied and resultants is 6 to 1, steam volume to hydrogen volume. A steam quantity in excess of this ratio at this temperature produces hydrogen in pounds to the extent of the weight of hydrogen in the steam exceeding the ratio. Eight times this weight in oxygen combines with the reagent material as oxides.

At 1200° F. the ratio is observed to drop approximately to a trifle under 4 to 1, and each of the above statements apply for excess steam over this ratio at this temperature.

At 1600° F. likewise in other respects as above the ratio approximates 2:1.

At 2000° F. nearly 3:2.

At 2400° F. virtually 1:1.

Beyond this temperature even with selected material, eliminating white cast iron and hard steel, it is difficult to avoid the tendency to melt and fuse, but it may be safely said that at approximately 2750° F. the larger quantity of the ratio is in favor of the hydrogen. The curve is as follows:

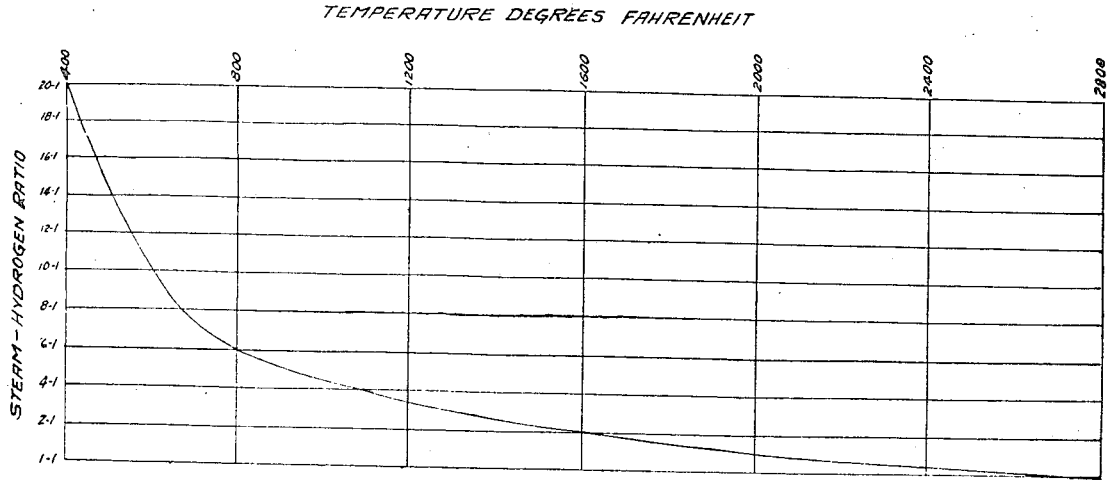

Thus, to preserve without reaction, hydrogen quantities emanating from the coal bed and passing through the reagent material, there must be supplied an amount of steam bearing ratio to the volume quantity of hydrogen as generally shown by the pre- 1,453,655 ceding curve. With this condition met, the excess steam requirement in pounds and the product gas in volume is derivable as follows:

$$\text{Cu. ft. water gas} = \text{CO} + \underbrace{2\left(\frac{\text{CO c. f.}}{13.5} \times \frac{16}{28}\right)}_{(a)} + \underbrace{\left(\frac{\text{CO c. f.}}{13.5} \times \frac{12}{28}\right) \times 8.5}_{(b)} + \underbrace{\frac{\frac{\text{CO c. f.}}{13.5} \times \frac{16}{28}}{8}}_{(c)} \times 188$$

where the first bracket represents $\text{CO}_2$ c. f. and the last represents H c. f.

$(a) \times \frac{9}{8}$ gives in pounds of water equivalent the steam reaction requirements of the reagent material.

However, it must be observed, as before explained, that as operation of the process obtains under low heat condition of the carbon bed, the steaming period is thus prolonged. Therefore, the quantity cubic feet water gas above produced by the process presented is in a volume greater than the quantity production by present practice.

A third step contemplated within the operation of the process is, when advisable, enrichment of the product gases emanating from the generator grate and through the reagent material. No attempt is made in these specifications to outline the various methods of gas enrichment which may be employed. The non-toxic, artificial gas produced by this process may be enriched with any suitable carbonaceous material, in gaseous, liquid or solid form, and to such extent that any degree of increased thermal value may be achieved, even though the intensity of such enrichment produces vapors instead of gas within the carburettor. Enrichment may be accomplished by methods customarily in practice for similar purposes, for instance:

There is delivered through pipe 13—Figure "D" into carburettor Figure "B" product gases from Figures "A" and "D" which are contacted with enriching material sprayed into Figure "B" through sprayer 6—Figure "B". The enriching material is, for instance, gas oil.

It is to be observed that this hydrogen-carbon-dioxide gas enriches into required thermal value for commercial or other use with the addition of less enriching material than is required by the present carbon monoxide containing commodity.

The only constituent occurrent in a gas made in the fashion in which water gas is made which will respond with thermal increase when contacting with enriching material, gas oil for instance, is hydrogen. This is true with respect to both the present carbon monoxide containing gas, and also with respect to the gaseous products of this process. Carbon monoxide is equally non-responsive to enrichment reaction as is the dioxide. Both compounds pass through the carburettor unaffected in this respect.

It is self-evident that a small percentage of hydrogen requires greater enrichment to elevate the general average of a gas to a given requirement than is required to effect like result where the hydrogen content of the gas is greater. For instance:

14 pounds of hydrogen with 226 pounds of a gas oil, such as $C_{16}H_{34}$, enriches into 240 pounds of ethane. 240 pounds of ethane is 3000 cubic feet of gas, with a total B. t. u. value of 5,292,000; whereas, the same quantity of oil with 30 pounds of hydrogen will enrich into 256 pounds of methane, which is 6016 cubic feet, of a total B. t. u. value of 6,070,000.

The comparison presented is:

From the same quantity of oil, under intensive enrichment requirements, the volume of resultant enriching gas possesses nearly eight hundred thousand less B. t. u.'s and only about one half the volume compared with the enriching gas which is produced when enrichment requirements are less, as is the case when increased hydrogen content of the blue gas enables a larger volume percentage to react with enrichment quantities.

The figures for the above are as follows:
226 lb. $C_{16}H_{34}$ enriching with hydrogen to ethane.

C       H
192 lb.   34 lb.
Add ------  14 lb.
_____
192 lb. C + 48 lb. H = 240 lb. $C_2H_6$ 240 lb. $C_2H_6$ = 3000 cu. ft. = 5,292,000 B. t. u. Same quantity 226 lb. $C_{16}H_{34}$ enriching with hydrogen to methane.

C       H
192 lb.   34 lb.
Add ------  30 lb.
_____
192 lb. C + 64 lb. H = 256 lb. $CH_4$ 256 lb. $CH_4$ = 6016 cu. ft. = 6,070,144 B. t. u.

A fourth step to be included when advisable in the operation of the process presented, consists in the reduction to desired extent of the carbon dioxide quantities of the resultant gas.

The effect of the presence of carbon dioxide on the candle power of water gas is well known. Even the occurrence of so small a percentage as $2\frac{1}{2}\%$, causes a loss of nearly 10% in the theoretical candle power available. The ratio increases until with a carbon dioxide content somewhat over one-half by volume, the candle power efficiency of the gas is virtually destroyed; whereas, the occurrence of carbon dioxide percentage in a gas is a detriment to the heat units produced through combustion, nevertheless, the detrimental effect is minute in comparison with the effect on candle power.

For instance, a 528 B. t. u. gas with so large a carbon dioxide content as $33\frac{1}{3}\%$, when combusted, will lose less than 15% of its theoretical thermal yield based upon a flame temperature in excess of 1000° F. The figures are:

$$\left.\begin{array}{l} CH_4 - 46\% \\ CO_2 - 33\% \\ H_2 - 21\% \end{array}\right\} \text{B. t. u. } 528$$

$CO_2$ sp. heat .2163

$$\frac{528}{\frac{1}{8.6} \times .33 \times .2163 \times 1000} = 15\%$$

Furthermore, it will be found that with a carbon dioxide content of 10%, the thermal flame value loss by combustion of the gas is virtually negligible, being considerably under 1%. The economically unsound practice of rating gas manufactured for public consumption on a candle power basis has virtually been discontinued. The standard requirements today are on a thermal unit basis and in conformity with such regulations, the gas manufactured by the process presented is most useful.

It will be found that gas manufactured by the process presented will contain up to 30% of carbon dioxide and in uses involving the combustion of the gas in a cold state, it may be found advisable to reduce this quantity. There are many familiar processes effectual for this purpose including the use of compounds of sodium, calcium and potassium. Possibly the cheapest and most convenient method is the reaction of caustic lime to the carbonate.

When the candle power standard governed gas values, much effort was made to rid the gas of even small carbon dioxide percentages. It is a known fact that even so low as 5% carbon dioxide content reduces the candle power of the gas by 20%.

In the use of caustic lime for this purpose, the many unsatisfactory results were found traceable to the difficulty of reducing small quantities of carbon dioxide present. A gas containing a large percentage of dioxide readily reacts and relinquishes such quantities up to a narrow residual of from 5 to 10%.

It has been shown above that so small a percentage of carbon dioxide has no appreciable effect upon complete recovery of the total thermal value of the gas through combustion.

Thus, as the fourth step of the process, by suitable and customary arrangement, the product gas should be passed through and in contact with caustic lime or other suitable material to reduce the carbon dioxide quantities to from 5 to 10% of the volume.

No improvement is suggested herein for washing, scrubbing and purifying the gas and customary practice is prescribed. However, it should be remarked that when the excess and undecomposed steam quantities occurrent in gas as manufactured by present practice is precipitated, a large percentage of the impurities of the gas are precipitated.

As excess steam quantities have been delivered while gas making in accordance with the process presented, between the coal bed of the generator and the reagent material employed, the customary purifying effect produced by condensation of excess steam quantities is materially augmented.

The various steps or phases of the process presented may be properly comprehended under the five divisions mentioned hereinbefore.

It is to be observed, however, that dependent upon uses to which the incident combustive gases may be put certain of the steps may be included or omitted in the manufacturing operation. When the product gases may be combusted under conditions whereby the initial heat incident to their manufacture is retained, it may be found advisable in many instances to eliminate both the methods presented for enriching and reducing carbon dioxide quantities. Where, however, it is the purpose in the manufacture of the gas to combust the same from a cold state, employment of all of the steps of the operation indicated may be found to be best practice.

By way of summary:

In the first step of the process, it has been shown that in the production of artificial gas by this process in the manner in which water gas is produced, that no regulation of operation is adopted to increase carbon monoxide. That, so far as total thermal content of the resultant gas is concerned, no reduction occurs through the production of carbon dioxide. Also, it has been shown that because of the lower temperatures at which water gas may be produced when no regard is paid to the quantity of carbon dioxide occurrent, that larger volume yield of gas results.

The second step of the process presents the use of a reagent material oxidizing in the presence of steam and returning to native state by the yielding of the oxygen of the oxide to carbon monoxide to make carbon dioxide. In this connection, it has been shown that the thermal value of the carbon monoxide thus eliminated is not greater than the thermal value of the hydrogen by this method substituted therefor. By functioning of the second step of the process it has been shown that conditions are supplied for the conversion of the carbon monoxide quantities emanating from the coal bed into carbon dioxide quantities without theoretic thermal loss.

The third step of the process which consists in increasing the thermal value of the gas through carburization or enriching, has been shown to require the addition of less carbonaceous material than is required for the enrichment of a carbon monoxide containing gas produced under similar circumstances.

The fourth step of the process deals with any suitable method for reducing to moderate proportion the carbon dioxide content and in this connection it has been remarked that large percentages of $CO_2$ readily are reduced to small percentages under conditions quite impractical for completely eliminating a small percentage of the dioxide.

The fifth step of the process has been shown to contemplate the washing, scrubbing and purifying of the commodity along the lines of customary usage.

There follows a quantitative calculation of the operation of a standard gas making unit in accordance with present practice contrasted with the operation of such a unit when modified and operated in accordance with the specifications and drawings of these disclosures.

*Standard 12 ft. water gas set.*

Standard practice operation.
Daily blue gas production 4,000,000 ft.
Enrichment values gas oil about 3.8 gals. for 525 B. t. u. per M—15,000 gallons.
Daily enriched gas production 4,250,000 cu. ft.

Estimates of precipitates from scrubbers, washers, purifiers, and condensers, checkerbrick carbonization, nitrates, oxides, tars, waste products and ingredients are eliminated as not materially germane to these disclosures. All calculations are reasonably correct, but approximate.

To facilitate examination a numeral is placed in front of each quantity when first derived and when referred to afterward the numeral follows the quantity for ready reference.

Hourly blue gas production $$\frac{4,000,000}{24} = 166667 \text{ c. f.}$$

Run composition (not considered exceptionally good, $CO_2$ a trifle high) hydrogen 53% carbon monoxide 41% carbon dioxide 6%.

(1) H  88,333 c. f. $\frac{88333}{188}$ = (2) 469.82 lbs.

(3) CO 68,334 c. f. $\frac{68334}{13.5}$ = (4) 5062 lbs.  (5) C 2169 lbs.
  (6) O 2893 "
  (9) C 320 "
(7) $CO_2$ 10,000 c. f. $\frac{10000}{8.5}$ = (8) 1177 lbs. (10) O 857 "

Obtained, approximately 500 gallons water + 2500 carbon, thus:

| $H_2O$ lb. | H lb. | O lb. | C lb. |
|---|---|---|---|
| 4219.82 = | 469.82 | 3750 | +2489 |

| | | | |
|---|---|---|---|
| H | 469.82 (2) | | |
| CO  5062 lbs. (4) | | 2893 (6) | +2169 (5) |
| $CO_2$ 1177 lbs. (8) | | 857 (10) + | 320 (9) |
| | | 3750 | 2489 |

An error of 1 lb. H is due to fractions not carried out. Thus, from the carbon bed, grate 1—Figure "A", for instance, there emanates under conditions shown in 1 hour of standard practice operation:

| | | | |
|---|---|---|---|
| H—469.82 lbs. (2) | 88,333 c. f. (1) | (325) | 28,708,225 B. t. u. |
| CO—5062 lbs. (4) | 68,324 c. f. (3) | | 22,071,882 " |
| $CO_2$ 1177 lbs. (8) | 10,000 c. f. (7) | | No combustive value. |

Blue gas ......... 166,667 c. f.      50,780,107 B. t. u.

$\frac{50780107}{166667} = 304$ B. t. u. per c. f.

Under standard practice operation there is found emanating from carbon bed 1—Figure "A", 5062 pounds (4) or 68,334 c. f. (3) of carbon monoxide per hour with associated blue gas components under operating conditions prescribed.

Of the 5062 pounds (4) of carbon monoxide, 2893 pounds (6) are oxygen. For the monoxide quantity to react into carbon dioxide an additional 2893 pounds of oxygen is required.

But for 2893 pounds of oxygen to be thus available oxygen to such an amount must be incorporated from steam ($H_2O$) releasing thereby in free state its concomitant of hydrogen. For example

| $H_2O$ | O | H |
|---|---|---|
| 3254.6 lbs. (11) | 2893 lbs. (12) | 361.6 lbs. |

Standard resultants.

$H_2$ 88333 c. f. (1)
CO 68334 c. f. (3)
$CO_2$ 10000 c. f. (7)

Total volume—166,667 c. f.
B. t. u. per ft.—304
Total B. t. u. 50,780,000 _____ 50,800,000

The process gas is shown as rid of carbon monoxide. The total B. t. u. values remain unimpaired. The volume is increased not only by addition to the hydrogen content, but by large addition to the non-toxic, though non-economic quantity $CO_2$.

Reactions within the carburettor are substantially as follows:

Supplied; process gas composed as above shown and gas oil for instance an oil of an average gravity and boiling point as typified by Hexadecane—$C_{16}H_{34}$ B. P. 549° F., sp. gr., .7319, wt. per gallon 6.07 lb. carbon (17) 5.157 lb. per gallon hydrogen (18) .913 lb. per gallon.

There will be used during the one hour run by process methods 675 gallons of this oil, resulting thus within the carburettor:

*Quantities supplied.*

| | Hydrogen | $CO_2$ | Carbon | Methane |
|---|---|---|---|---|
| Gas | 469.8 lb. (2) 361.6 lb. (12) | 77,617 c. f. (15) | | |
| Oil 675 gallons 4097.25 pounds | 616.4 lb. | | 3481 lb. | |
| Totals | 1447.8 lb. | 77,617 c. f. | 3481 lb. | |
| Reaction quantities— | 1160 lb. | | 3481 lb. | 4641 lb. |
| | 287.8 lb. 54106 c. f. | 77,617 c. f. | ......... | 109063 c. f. |

| | Volume cu. ft. | B. t. u. |
|---|---|---|
| Hydrogen | 54106 | 17,584,450 |
| Methane | 1090 3 | 110,044,567 |
| $CO_2$ | 77617 | ......... |
| Resultant gas (19) | 240786 cu. ft. (20) | 127,629,017 |

$\frac{(20)}{(19)}$ = 530 B. t. u. per cu. ft.

$\frac{675 \text{ gallons oil}}{(19)}$ = 2.7 gal. oil per M feet.

Thus, of necessity, in converting the CO into $CO_2$, there must be added to the passing gaseous mass 361.6 lbs. (12) of hydrogen and taken therefrom 5062 pounds of carbon monoxide. The additional quantity is (13) 67,980.8 cu. ft. H (188). Opposed to this quantity is the thermal and volume loss in CO and an augmentation of $CO_2$ quantities.

Thus we find the products of standard operation and operation by this process contrasted as follows:—

Process resultants.

(14) 156,313.8 c. f. (1) + (13)
( _____ )
(15) 77,617.5 c. f. (7) + [(4) + (6) × 8.5]

(16) 233,931.3 c. f.
212

The foregoing is to be contrasted with operation in accordance with present practice. The quantities having been shown to be; gas produced 177,000 cu. ft., thermal value 525 B. t. u., enrichment requirement 3.8 gallons per M cu. ft. The process gas being free of monoxide and the gas of present practice containing upwards of 68,000 cu. ft.

If the product gas 240786 cu. ft. is reduced to approximately the volume produced by standard practice operation, by reducing $CO_2$ constituent in accordance with the methods of the fourth step of the process, there results approximately 180,000 cu. ft. of gas with less than a ten per cent $CO_2$ content. The effect of such quantity of $CO_2$ has been shown to be negligible upon heat unit production through combustion. The B. t. u. value of such gas, however, by such reduction of the $CO_2$ quantities has been raised from 525 B. t. u. gas to 710 B. t. u. per cu. ft.

Enrichment quantities have been figured on the basis of the values actually reacting into enriching gases and the quantity estimate for this purpose should be increased to the extent of loss occasioned through carbonization within the enriching unit.

It is to be observed, however, that any loss so occasioned is more than counterbalanced by the increased thermal value of the resultant process gas through the reduction of carbon dioxide quantities.

Practical operation of the process becomes extremely simple by the observance of two rules. First in the event of the occurrence of carbon monoxide quantities in the gas product, steam deliveries should be increased. Second, upon the presence of excessive quantities of undecomposed steam in the gaseous product, steam deliveries should be decreased. The reasons for these regulations are these:

With respect to the first, if the steam deliveries reacting upon the reagent material are insufficient to provide sufficient oxide which will unite with the monoxide quantities in the production of carbon dioxide, monoxide quantities will escape. The necessary solution is increase of steam delivery which will add to the quantity of oxidized reagent material, thus affording the needed requirement for oxidation of the monoxide.

With respect to the second, if excessive steam be supplied, though there is available under these conditions ample oxidized reagent material for conversion of the monoxide quantities to rejuvenate the reagent material it follows that as an oxide steam quantities pass through the element without reaction.

The operation suggestion, however, is simple which remedies both conditions, namely, upon the appearance of monoxide quantities in the product gases, increase the steam delivery available for reaction upon the reagent; upon the presence in the resultant gases of excess quantities of undecomposed steam, decrease the steam supply.

The essence of the process lies not in apparatus, operation method or availability of by-products, but in the production of a gas, rendered non-toxic by the substitution of hydrogen for carbon monoxide, so that the thermal value lost in monoxide is gained in hydrogen.

Many different apparatus arrangements and structures are in mind, departing from the illustrative apparatus shown in the drawings. In cases, for instance, of small units and shallow beds, the reagent material may be supported within the generator itself with necessary changes to accommodate such installation. Suitable change may be made to permit the use of water gas units in which either or both blast or steam may be delivered above or below the coal bed grate. A special element, such as "D", may be installed upon the approximate foundation line of the generator, avoiding the need of installation of coal chute and other changes. Steam available for reagent reaction may be supplied above or below the coal bed grate of the generator or into other units. Series or alternating sequence of materials may be installed supported and contacted with the gaseous material present in any suitable manner. It is the purpose hereof to present the process involved as applicable to any apparatus susceptible of such operation as to permit functioning of the methods presented.

Any special device, apparatus or method performing more efficiently the functions of the units employed, may be utilized.

It should be observed that within the unit in which enrichment quantities are supplied, that the greater the heat condition maintained, the more rarefied is the resultant enriched gas, and that with regulation, the reaction values may descend the scale of rarefication even into vapors liquefiable at atmospheric conditions of temperature and pressure.

The use of insulation is not shown in the drawings as it is not required in presenting the process, but in practice any suitable material and construction may be used for the purpose.

Reference to shavings, borings and filings, is not intended to restrict the physical make up of the reagent employed; porous or spongy formations or any other material form or arrangement may be adopted which will afford necessary contact surface.

It is understood that in the construction of the apparatus, installation of fans or blowers for increasing velocity of gaseous material with respect to conditioning the time element of contact may be established at suitable locations within the apparatus.

It is further to be understood that in the event of the manufacture of a gas contemplating the reaction between steam and petroleum fractions whereby the resultant quantities are similar to those of water gas manufactured from coal by containing hydrogen, carbon monoxide and carbon dioxide quantities, that the process submitted is utilizable under such circumstances. What is claimed as new is:

1. A process for producing an artificial combustible gas which consists of reacting steam and carbonaceous material into hydrogen, carbon monoxide and carbon dioxide; removing to desired extent the carbon monoxide by contacting the gas, steam and a reagent material which will oxidize with the steam releasing hydrogen and which will deoxidize with the carbon monoxide forming carbon dioxide and enriching said gas by further contacting with carbonaceous material and reducing the carbon dioxide content of the gas to determined extent by contacting with absorbent material and freeing the gas of other impurities by scrubbing, washing and purifying.

2. A process for producing an artificial combustible gas which consists of reacting steam and carbonaceous material into hydrogen, carbon monoxide and carbon dioxide, removing to desired extent the carbon monoxide by contacting the gas, steam and a reagent material which will oxidize with the steam releasing hydrogen and which will deoxidize with the carbon monoxide forming carbon dioxide and enriching said gas by further contacting with carbonaceous material and reducing the carbon dioxide content of the gas to determined extent by contacting with reacting material, and freeing the gas of other impurities by scrubbing, washing and purifying.

3. A process for producing a substantially non-toxic combustible gas which consists of reacting steam and carbonaceous material into hydrogen, carbon monoxide and carbon dioxide, removing the carbon monoxide by contacting the gas, steam and a reagent material which will oxidize with the steam releasing hydrogen and which will deoxidize with the carbon monoxide forming carbon dioxide, and enriching said gas by further contacting with carbonaceous material, and reducing the carbon dioxide content by suitable means and removing other impurities by means of washing, scrubbing and purifying.

4. A process for increasing production quantities in the manufacture of certain combustible gases which consists in contacting, under suitable operating conditions, carbonaceous material and steam and producing therefrom a mixture of hydrogen, carbon monoxide and carbon dioxide and continuing the operation to low temperatures conditioned only by the heat requirement for steam decomposition, enriching the said mixture by suitable means and removing therefrom any prescribed amount of the carbon dioxide quantities.

5. A process for increasing the production quantities of certain enriched combustible gases which consists in contacting, under suitable operating conditions, carbonaceous material and steam and producing therefrom hydrogen, carbon monoxide and carbon dioxide and continuing the operation to low temperatures regardless of increasing carbon dioxide quantities resulting and thereby causing a large increase in the amount of carbonaceous material entering into chemical reaction in the gas making, which under high temperatures would have been consumed for their maintenance and thereby largely increasing the volume of the gas and the hydrogen content thereof, and enriching said gas with enriching quantities reduced because of increased hydrogen content.

6. A process for reducing enrichment requirements of certain combustible gases which consists in reacting said gas with a reagent material under such conditions that the carbon monoxide is replaced by hydrogen of at least equal thermal value, and enriching said gas with enriching quantities reduced because of increased hydrogen content.

7. A process for producing an artificial gas substantially free from toxic properties due to the presence of carbon monoxide which consists in manufacturing in any suitable manner water gas, eliminating therefrom substantially all the carbon monoxide elements, substituting therefor by use of a reagent material a B. t. u. equivalent of hydrogen and enriching the gas mixture to desired thermal value.

8. A process for producing an artificial gas substntially free from toxic properties due to the presence of carbon monoxide, which consists in producing water gas, passing the same to a double conversion or non-catalytic agent and reducing the carbon monoxide quantities of the water gas, substituting for such reduction of quantities a B. t. u. equivalent of hydrogen, and enriching to desired extent the resultant gases.

9. A process for increasing the quantity production of enriched converted water gas, which consists in continuing the reactions of the carbonaceous material and steam within the generator to low temperatures increasing thereby the percentage of carbonaceous material entering gas making reactions contrasted with the amount consumed for heat generation, contacting the gas produced with a reagent material by which hydrogen is substituted for substantially all the carbon monoxide quantities, and enriching said gas with enrichment quantities reduced because of the increased hydrogen content.

10. A process for producing enriched artificial gas substantially free from toxic properties, which consists in operating a water gas generator at low temperature to avoid the production of carbon monoxide quantities and supplying a reagent zone in which through chemical contact with the reagent such carbon monoxide as is produced is eliminated and there is substituted in its stead hydrogen possessing at least the equivalent of the thermal value of the carbon monoxide, and enriching the resultant gaseous product with enriching quantities reduced because of the increased hydrogen content.

11. A process for the manufacture of a combustible gas which consists in producing a non-toxic gas of greater volume and higher thermal value than the quantity and richness of water gas produced from a like carbonaceous mass by continuing the gas-making period incident to water gas manufacture to low temperatures regardless of carbon dioxide increase, and reacting the product gas in the presence of steam and reagent material so that hydrogen quantities are substituted for carbon monoxide quantities of no less volume or thermal value and enriching the same by re-contact with carbonaceous material.

12. A process for reducing the cost of artificial gas production which consists in causing a larger percentage of a carbonaceous mass to enter into gas-making chemical reaction than obtains in the standard methods of water gas production by continuing the gas-making run to low temperature and enriching the resultant gas with less additional carbonaceous material than is required in standard water gas operations because of the hydrogen content in the resultant gas, and reducing the quantity of resultant carbon dioxide to desired amount by contact with suitable material.

13. A process for modifying and enriching carbon monoxide containing gas, which consists in converting carbon monoxide into carbon dioxide by any suitable means with hydrogen release, and contacting the modified gas with carbonaceous material thereby enriching the hydrogen content thereof to any desired extent, and reducing the carbon dioxide content of such modified gas to substantially any desired extent by reacting with any suitable material.

14. A process for modifying and enriching carbon monoxide containing gas, which consists in converting carbon monoxide into carbon dioxide by any suitable means with hydrogen release and enriching the modified gas.

15. A process for increasing the volume and thermal value of combustible gas recovery from carbonaceous material, which consists in reacting carbonaceous material and steam under high temperature produced by internal combustion, continuing contact of said substances to substantially a temperature at which reaction fails and causing greater incorporation of carbonaceous material into the gas-making reaction than when reaction is stayed at higher temperature, enriching the resultant gases by recontact with carbonaceous material, of which reduced quantities are required because of increased hydrogen content, and reducing the carbon dioxide content and impurities present, when necessary, by any suitable means.

16. A process for producing a substantially non-toxic combustible gas from carbonaceous material and steam, greater in volume and thermal value than that of water gas producible from like quantities, which consists in operating a water gas generator during the gas-making run to low temperature, substantially that at which reaction fails, increasing thereby the carbon dioxide and hydrogen quantities and converting substantially all of the reduced carbon monoxide values into carbon dioxide and hydrogen, the hydrogen of substantially the same volume and thermal value as the carbon monoxide converted, through reaction within a reagent zone suitably equipped and operated with a reagent material and steam, so that the reagent is oxidized releasing hydrogen and is dioxidized forming carbon dioxide and rejuvenating itself, and enriching the resultant gas by contacting with carbonaceous material and reducing, if necessary, carbon dioxide and impurities present by suitable means.

17. A process for producing a non-toxic combustible gas from carbonaceous material and steam, greater in volume and thermal value than that of water gas produced from like quantities, which consists in operating a water gas generator during the gas-making run to low temperature, to substantially that at which reaction fails, causing thereby increase of the quantity of carbonaceous matter entering gas-making reactions and decreasing the amount of carbonaceous matter required for heat production and increasing thereby the production of carbon dioxide and hydrogen quantities and converting the reduced carbon monoxide values into carbon dioxide and hydrogen, the hydrogen being of substantially the same volume and thermal value as the carbon monoxide converted, through reaction within a reagent zone suitably equipped and operated with a reagent material and steam so that the reagent is oxidized releasing hydrogen and is dioxidized forming carbon dioxide and rejuvenating itself, and enriching the resultant gas by contacting with carbonaceous material and removing therefrom by suitable means the carbon dioxide content to selected amount and effecting, to necessary extent, elimination of any toxic quantities and impurities present through the agency of washers, scrubbers and purifiers.

In testimony whereof I affix my signature, in the presence of two witnesses.

HAROLD R. BERRY.

Witnesses:
E. S. SUFFERN,
T. E. HARDING, JR.